United States Patent [19]

Fantone

[11] 4,396,289
[45] Aug. 2, 1983

[54] METHOD AND APPARATUS FOR HOLOGRAPHIC TESTING OF OPTICAL COMPONENTS

[75] Inventor: Stephen D. Fantone, Saugus, Mass.

[73] Assignee: Polaroid Corporation, Cambridge, Mass.

[21] Appl. No.: 201,499

[22] Filed: Oct. 28, 1980

[51] Int. Cl.$^3$ ............................................. G01B 9/021
[52] U.S. Cl. ..................................... 356/348; 356/360
[58] Field of Search ............... 356/347, 348, 359, 360; 350/3.67, 3.85, 3.86

[56] References Cited

U.S. PATENT DOCUMENTS

| | | | |
|---|---|---|---|
| 3,533,675 | 10/1970 | Brooks | 350/3.5 |
| 3,592,548 | 7/1971 | Majkowski | 356/71 |
| 3,619,064 | 11/1971 | Brooks | 356/109 |
| 3,642,374 | 2/1972 | Matsumoto et al. | 356/107 |
| 3,672,776 | 6/1972 | Brooks | 356/106 |
| 3,870,414 | 3/1975 | Duffy | 356/109 |
| 3,874,796 | 4/1975 | Chovan et al. | 356/109 |
| 3,905,703 | 9/1975 | Matsumoto | 356/106 R |

OTHER PUBLICATIONS

Emmel et al., "A New Instrument for Routine Optical Testing of General Aspherics", *Proc. SPIE*, vol. 171, pp. 93–99, 1/79.

*Primary Examiner*—John K. Corbin
*Assistant Examiner*—Matthew W. Koren
*Attorney, Agent, or Firm*—Francis J. Caufield

[57] ABSTRACT

A holographic interferometric method for determining dimensional differences between two objects having complementary shapes. The first step of the method is to construct a hologram of one of the objects using radiant energy of predetermined temporal and spatial coherence. The hologram of the one object is then reconstructed in a well-known manner and operates to diffract radiant energy incident thereto into n-number of wavefronts where $-a \leq n \leq +a$ and a is an integer. A reflected wavefront is then formed from the other object by directing thereat radiant energy substantially identical to that used to either construct or reconstruct the hologram. Then, the other object wavefront is directed onto the hologram to reconstruct the hologram again by transmitting therethrough the other object wavefront. The hologram operates to diffract the other object wavefront into n-number of wavefronts where $-a \leq n \leq +a$ and a is an integer. A predetermined $n^{th}$-order wavefront from the first hologram reconstruction is then combined with the corresponding $(n+1)^{th}$-order wavefront from the other hologram reconstruction to form an interference pattern. The interference pattern is then interpreted to determine dimensional differences between the objects. Apparatus by which the method of the invention can be conveniently practiced is also disclosed.

35 Claims, 4 Drawing Figures

METHOD AND APPARATUS FOR HOLOGRAPHIC TESTING OF OPTICAL COMPONENTS

BACKGROUND OF THE INVENTION

1. Field of the Invention

This invention, in general, relates to non-destructive testing methods and apparatus for determining dimensional differences between objects having complementary shapes and, in particular, to interferometric methods and apparatus by which a hologram is utilized to determine dimensional differences between precision optical surfaces and molds which are used in their fabrication.

2. Description of the Prior Art

Holography, or wavefront reconstruction, is a process by which the amplitude and phase variation across a wavefront from an object can be recorded photographically and subsequently reproduced. The photographic record of the wavefront from the object is referred to as a hologram and the wavefront reproduced from the hologram is said to have been reconstructed. The reconstructed wavefront is identical in form to the original wavefront from the object and produces the same effects as would the original.

One important practical application of wavefront reconstruction has been its utilization in the area of interferometry, a non-destructive test method which utilizes light interference phenomena for measuring geometric differences between objects. The fact that a wavefront reconstructed from a hologram can substitute for the original wavefront from an object has lead to several interesting techniques in this area. One is referred to as a double exposure technique wherein a hologram of an object is exposed and then reexposed with the object distorted. The reconstructed hologram results in a fringe pattern indicative of the displacements suffered by the object.

Other techniques interfere a reconstructed wavefront from a hologram of an object with an actual wavefront from the object to develop an interference pattern which indicates any changes (which may have occurred) in the object between the time its holograph was constructed and a later time.

It is also well-known to utilize holographic interferometry to compare wavefronts from parts from a manufacturing process with a holographic reconstruction which generates a wavefront representative of a standard for that part. Here, the holograph is usually generated by a computer or from a master or "perfect" part. Both methods work well, but each has its own particular shortcomings. The computer technique is expensive and time consuming, and the generation of a hologram from a master or "perfect" part requires that such a part exist, a requirement that can rarely be satisfied particularly during the early stages of manufacturing.

It is, therefore, a primary object of the present invention to provide an improved holographic interferometric method and apparatus by which parts from a manufacturing process can be easily measured in a non-destructive manner to determine their acceptability.

It is another object of the present invention to provide methods and apparatus by which a hologram can be utilized to determine dimensional differences between objects having complementary shapes.

Other objects of the invention will, in part, be obvious and will, in part, appear hereinafter. The invention accordingly comprises the apparatus and method possessing the sequence of steps which are exemplified in the following detailed disclosure.

SUMMARY OF THE INVENTION

This invention, in general, relates to nondestructive testing methods and apparatus for determining dimensional differences between objects having complementary shapes and, in particular, to interferometric methods and apparatus by which a hologram is utilized to determine dimensional differences between precision optical surfaces and molds which are used in their fabrication.

The method of the invention comprises the steps of first constructing a hologram of one of the objects using radiant energy of predetermined temporal and spatial coherence.

The hologram of the first object is then reconstructed using radiant energy substantially identical to that used to construct the hologram. The hologram operates to diffract the radiant energy incident thereto into n-number of wavefronts where $-a \leq n \leq +a$ and a is an integer.

A wavefront is then formed from the other object by directing thereat radiant energy substantially identical to that used to either construct or reconstruct the hologram of the first object.

The wavefront from the other object is then directed at the hologram of the first object to reconstruct the hologram again by transmitting therethrough the wavefront from the second object. The hologram also operates to diffract the wavefront from the second object into n-number of wavefronts where $-a \leq n \leq +a$ and a is an integer.

The $n^{th}$-order wavefront from the first hologram reconstruction is then combined with a corresponding $(n+1)^{th}$-order wavefront from the other hologram reconstruction to form an interference pattern.

The interference pattern is then interpreted to determine the dimensional differences between the objects.

In an illustrated application of the method of the invention, a hologram is made of a mold and this hologram is thereafter reconstructed to form a wavefront which is then compared with a wavefront formed from a part fabricated with the mold to determine how well the part conforms to the mold shape. In this application, it is preferred to compare the wavefront from the part with the $(-1)$-order refracted wavefront from the hologram reconstruction to form a viewable interference pattern which is then interpreted to determine the conformance of the part shape with that of the mold shape. Alternatively, the mold hologram can be reconstructed a second time using the part wavefront and then the $+1$-order wavefront from the first hologram reconstruction can be compared with the $0^{th}$-refracted order from the second reconstruction of the mold hologram.

Apparatus is also disclosed by which the steps of the method of the invention can be conveniently practiced.

DESCRIPTION OF THE DRAWINGS

The novel features that are considered characteristic of the invention are set forth with particularity in the appended claims. The preferred mode of practicing the invention, however, will best be understood from the following description of the illustrated method and apparatus when read in connection with the accompanying drawings wherein like numbers have been employed in the different figures to denote the same part and wherein:

DESCRIPTION OF THE PREFERRED METHOD AND APPARATUS

This invention, in general, relates to nondestructive testing methods and apparatus for determining dimensional differences between objects having complementary shapes. In particular, the invention is an interferometric method and apparatus by which a hologram is utilized to determine dimensional differences between precision optical surfaces and molds or mold inserts which are used in their fabrication. However, it is to be expressly understood that the method and apparatus of the invention are not restricted in application to only the measurement of optical surfaces because other objects having complementary shapes are amenable to measurement by utilizing the method and apparatus of the invention. Moreover, either opaque or transparent objects can be compared.

Figure 1:
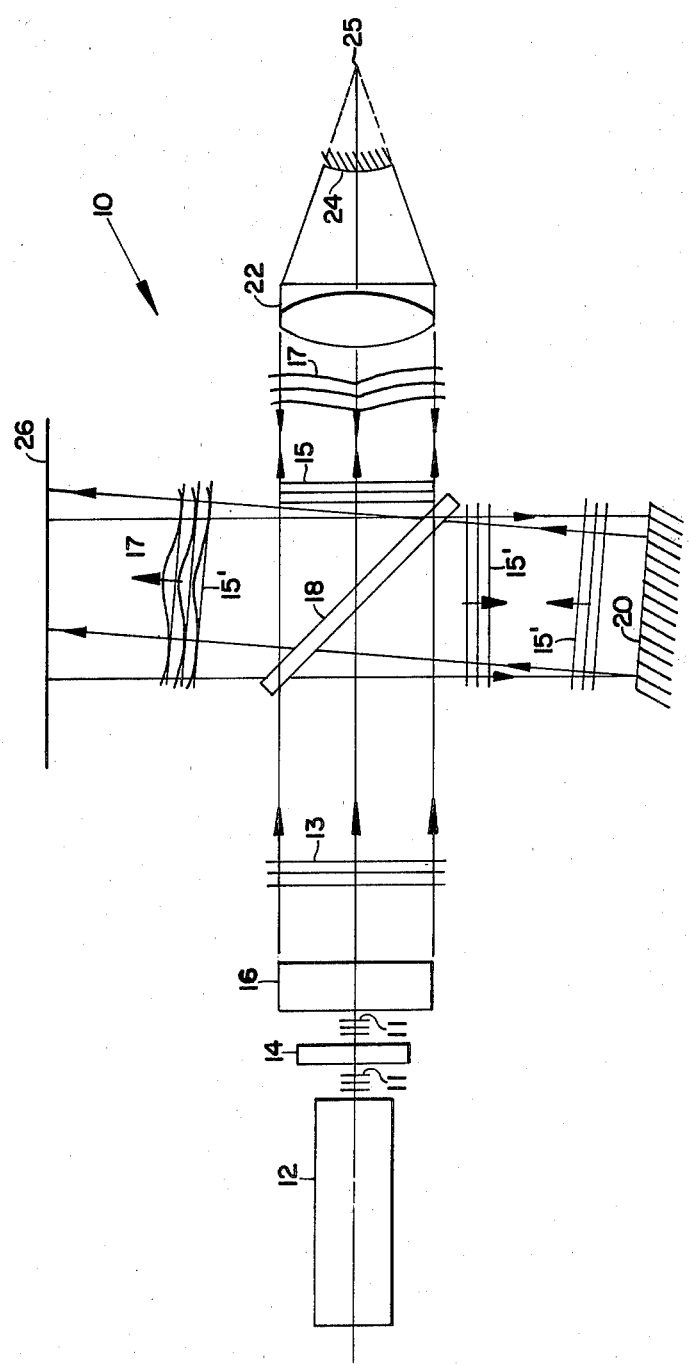
FIG. 1 is a diagrammatic representation of apparatus by which a hologram of an object can be constructed.

The first step in the method of the invention is to construct a hologram of one of the objects, preferably by using an interferometer such as that designated generally at 10 in FIG. 1. The interferometer 10 comprises a helium-neon laser 12 which operates in a well-known manner to provide a monochromatic source of radiant energy (beam 11) which, as is well-known, is spatially and temporally coherent. Positioned forwardly of the laser 12 is a conventional shutter 14 which operates in a well-known manner to selectively interrupt the beam of radiant energy (11) from the laser 12 for purposes of controlling exposure.

For purposes of expanding the laser beam 11 after it has passed through the shutter 14, there is provided beam expanding optics which are designated generally at 16. The beam expanding optics, for example, could include a microscope objective which focuses the laser beam 11 onto a pinhole and a collimating lens which accepts the expanding laser wavefront from the pinhole and collimates that wavefront into a plane wavefront illustrated diagrammatically at 13. The beam expanding optics are preferably structured in a well-known manner to expand the beam 11 so that the size of the expanded plane wavefront 13 is large enough to encompass any objects at which the plane wavefront 13 is directed.

The plane wavefront 13 is split into two components by a 45°-beamsplitter 18. One of the components, the one transmitted by the beamsplitter 18, is designated at 15 and the other component, the one reflected from the beamsplitter 18, is designated at 15'. The transmitted component 15 is focused by a high-quality lens 22 towards the surface of one of the objects which, in this case, is a convex mold insert which is designated generally at 24. The mold insert 24 has a highly-polished, i.e., specular, aspheric surface, having a center of curvature generally at a point 25 which is also the approximate focal point of the lens 22.

With the foregoing arrangement, the transmitted wavefront 15 is directed onto the aspheric surface of the mold insert 24 and is retroreflected thereby back to the lens 22 where it is recollimated but is now in the form of an aspheric wavefront 17. The aspheric wavefront 17 contains all possible optical information regarding the mold insert 24 and is directed toward a photographic plate 26 or other suitable recording medium by the beamsplitter 18. The photographic plate 26 is held in place in a well-known manner.

The reflected wavefront 15' is reflected from a tilted plane mirror 20 and thereafter passes through the beamsplitter 18 where it is combined with the aspheric wavefront 17 from the mold insert 24. The combined wavefronts 15' and 17 form an interference pattern that is recorded in the photographic plate 26 during its exposure which is accomplished in a well-known manner. The photographic plate 26 is then developed and preferably bleached in a well-known manner and thereafter represents a hologram of the insert 24. As is well-known, the hologram 26 is a diffraction pattern that is uniquely related to the geometry of the mold insert 24.

The mirror 20 is tilted so that when the hologram 26 is reconstructed, the diffracted wavefronts which it forms will have sufficient angular separation between them so that they can be conveniently spatially filtered. This will be best understood by now referring to FIG. 2 wherein there is shown a diagrammatic representation illustrating the optical action of the hologram 26 when subjected to a monochromatic coherent source which is represented by a plane wavefront 28 that can be assumed to have originated from the laser 12. The action of the hologram 26 on the plane wavefront 28 is much like the action of a diffraction grating consisting of uniformly spaced apart opaque and transparent slits. The hologram 26 operates to generate a number of wavefronts by interaction of the wavefront 28 with the diffraction structure recorded in the hologram 26. These wavefronts are radiated at various angles which are related to the spacing between the diffraction patterns in the hologram 26. A zero-order wavefront propagates in the same direction as the incident wave 28 and can be regarded as an attenuated version of the incident wavefront 28. In addition, there are two first-order diffracted wavefronts, one on each side of the zero-order wave. Beyond these occur $2^{nd}$-, $3^{rd}$- and higher-order diffracted wavefronts. However, the higher-order diffracted wavefronts are not illustrated because it is preferred that the photographic plate be developed and bleached in such a way so as to de-emphasize the diffraction orders higher than the first two.

Figure 2:
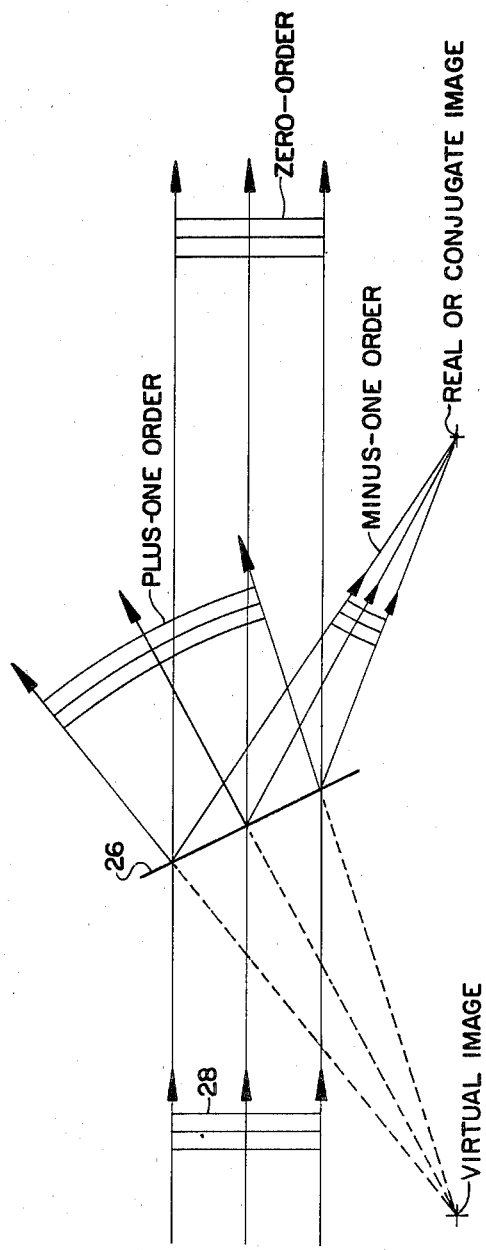
FIG. 2 is a diagrammatic representation illustrating the reconstruction of a hologram such as that which can be formed by the apparatus of FIG. 1.

The diffracted wavefronts formed by the hologram 26 are related in a simple and predictable manner to the irregularities, both in spacing and contrast, of the hologram fringe pattern. The distortions of the diffracted wavefronts by the fringe irregularities of the hologram 26 are precisely those distortions on the original wavefront from the object that give rise to the fringe irregularities. The two sets of $1^{st}$-order diffracted waves produced by the hologram 26 are each an exact replica of the waves that issued from the original object (insert 24). However, the $1^{st}$-order diffracted wavefronts differ from each other in one important respect. One diffracted order, the +1-order, consists of waves that, when projected back toward the illuminating source, seem to emanate from an apparent object located where the original object was located. It is said that these waves produce a virtual image, similar to the virtual images seen in a mirror (FIG. 2). The other 1$^{st}$-order diffracted waves, the (−1)-order waves, are also accurate replicas of the original waves from the object (insert 24), except that they have conjugate, or reversed, curvature. That is, for conjugate wavefronts originally diverging spherical waves from an object point are now converted into converging spherical waves. These waves produce a real image, which can be photographed directly, without a lens, by placing a photographic plate at the image position.

The process described above by which diffracted ordered wavefronts are reproduced from a hologram by directing monochromatic coherent light at it is referred to as reconstruction.

Figure 3:
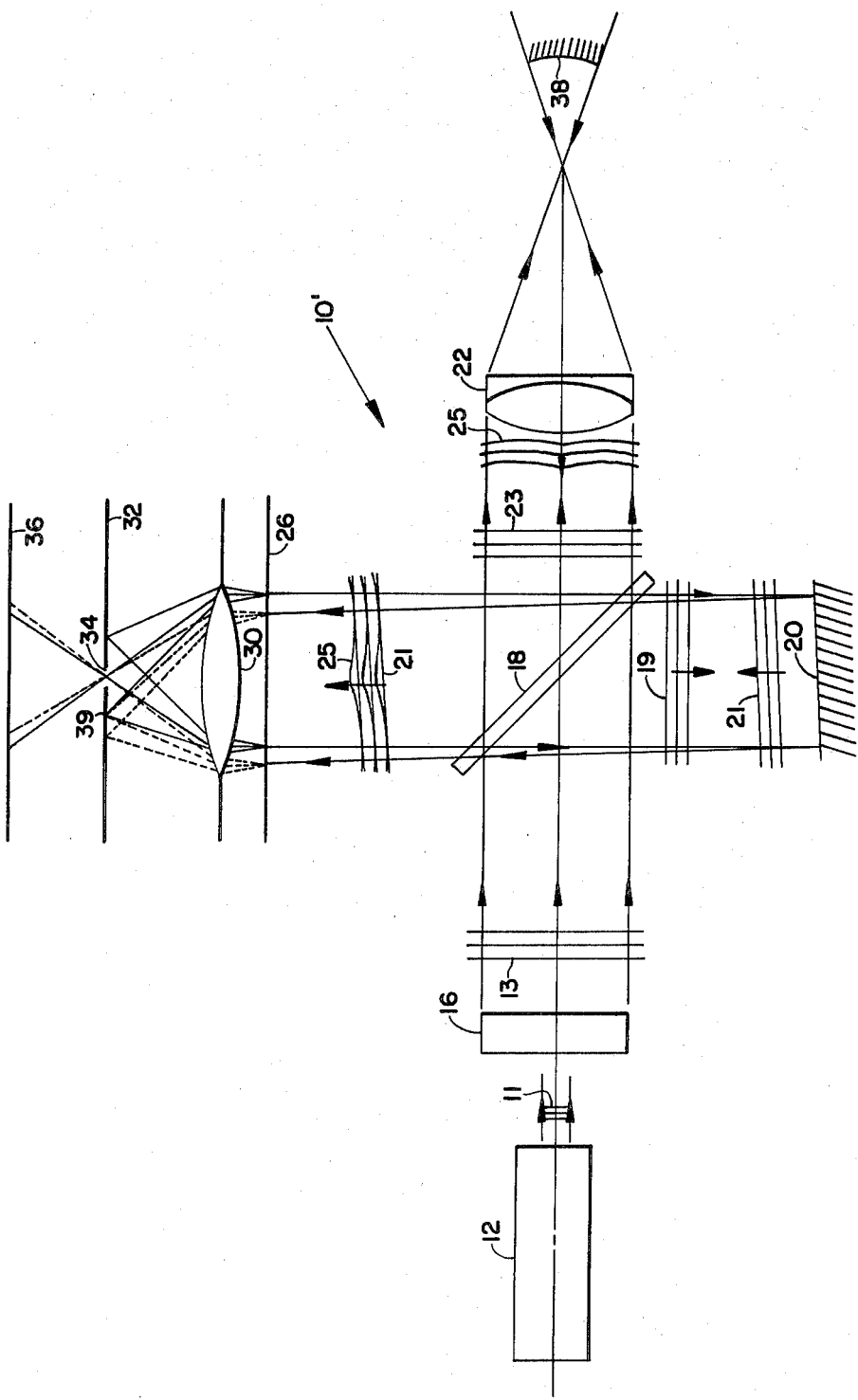
FIG. 3 is a diagrammatic representation of apparatus by which the hologram constructed in FIG. 1 is utilized to determine the dimensional differences between one object and another having a complementary shape thereto.

To utilize the hologram 26 to test aspheric optical components fabricated with the convex mold insert 24, a modified version of the interferometer 10, designated as 10' in FIG. 3, is utilized. The interferometer 10' has different geometry than that of the interferomter 10 and, also, includes some additional optics. However, it will be apparent that the interferometer 10 can easily be converted to the arrangement of FIG. 3.

The hologram 26 is placed in the same location in the interferometer 10' in which the photographic plate was exposed when in the FIG. 1 arrangement, and the aspheric test component, i.e., the part under test (38), is placed behind the lens 22 as shown in the arrangement illustrated in FIG. 3. Auxiliary optics which comprise a spatial filtering arrangement including a lens 30 and an opaque plate 32 having a pinhole or slit 34 therein are provided for reasons which will become apparent hereinafter. Also, the mirror 20 is tilted at an angle opposite to that which was used during exposure of the photographic plate (26).

After the hologram 26 has been fabricated and placed in the modified testing interferometer 10' shown in FIG. 3, the remaining steps of the preferred method of the invention are carried out through the use of the modified interferometer 10' arrangement in the following manner. The beam 11 from the laser 12 is again expanded in the manner previously described through the use of the beam-expanding optics 16 to form the plane wavefront 13. It will be noted that in this arrangement the shutter 14 is not necessary. Again, the plane wavefront 13 is split into two component parts by the beamsplitter 18. The reflected component of the wavefront 13, which is designated at 19, is directed towards the plane mirror 20 which has been tilted now at an angle opposite to the angle at which it was tilted to fabricate the hologram 26. The reflected component wavefront 19 is reflected by the mirror 20 to form a plane wavefront 21 which is directed toward the hologram 26, passing through the beamsplitter 18, but now at an angle which is opposite to that at which the corresponding wavefront (15') traveled during the fabrication of the hologram 26. The plane wavefront 21 strikes the hologram 26 and reconstructs it in the manner given in the description made in connection with FIG. 2. That is, the hologram 26 diffracts the plane wavefront 21 into ordered wavefronts comprising the zeroth and plus and minus one-orders, the higher diffracted orders having been suppressed by the development treatment given to the photographic plate on which the hologram 26 is recorded.

The transmitted wavefront through the beamsplitter 18, designated at 23, is focused by the lens 22. The part 38 having the complementary shape to the mold insert 24 is behind the focal point of the lens 22 by a distance which is equivalent to distance which the insert 24 was placed forward of the focal point of the lens 22 during the fabrication of the hologram 26. After passing through the focal point of the lens 22, the wavefront 23 expands and is retroreflected from the part 38 back to the focal point of the lens 22 after which it is recollimated by the lens 22 but is now an aspheric wavefront 25, having been distorted by the shape of the surface of the part 38. It will be noted that the aspheric wavefront 25, having been formed by the part 38 whose shape is complementary to that of the insert 24, should, if the part 38 perfectly conforms to the shape of the insert 24, be exactly the same as the (−1)-order wavefront formed by passing the plane wave 21 through the hologram 26 since the part 38, if perfect, is the exact conjugate of the mold insert 24.

The aspheric wavefront 25 is then reflected from the beamsplitter 18 and is thereafter combined with the plane wavefront 21. The aspheric wavefront 25 then passes through the hologram 26 to provide a second reconstruction of the hologram 26 in the same manner as was previously described. That is, the hologram 26 diffracts the aspheric wavefront 25 producing three diffracted orders, the 0$^{th}$-order which represents the aspheric wavefront 25 attenuated and plus and minus one-orders. All of the diffracted ordered wavefronts from both reconstructions of the hologram 26 are then focused by the lens 30 onto a plane in which the opaque plate 32 resides.

Because the hologram 26 is constructed with the mirror 20 tilted as shown in FIG. 1, the reconstructions result in diffracted wavefront orders which, when focused by the lens 30, are spatially separated at different focal points over the plate 32. With the mirror 20 tilted as indicated in FIG. 3, the focal points of the diffracted orders which are formed as a result of the first reconstruction of the hologram 26, upon passing the plane wavefront 21 through the hologram 26, are overlapped with respect to the diffracted orders which are formed as a result of the second reconstruction of the hologram 26 upon passing the aspheric wavefront 25 through the hologram 26. This is illustrated more clearly in FIG. 4 where it is shown that the 0$^{th}$-order of the second reconstruction is combined with the (−1)-order of the first reconstruction where both are brought to a focus at the pinhole or slit 34 located in the opaque plate 32. All of the other diffracted orders of the hologram 26 are thus spatially filtered from passing beyond the opaque plate 32. The combined 0$^{th}$-order from the aspheric wavefront 25 and the (−1)-order from the plane wavefront (21) reconstruction form an interference pattern on a plane 36. The interference pattern so formed is then interpreted in a well-known manner to determine any dimensional differences between the mold insert 24 and the part 38 under test. The intereference pattern formed on the plane 36 can be viewed directly for interpretation but it is preferred to image the pattern onto a vidicon tube via suitable relay optics so that the interference pattern so formed can be visually displayed on a television screen. If permanent records are required, the interference pattern displayed on the television screen can be easily photographed in a well-known manner.

Figure 4:
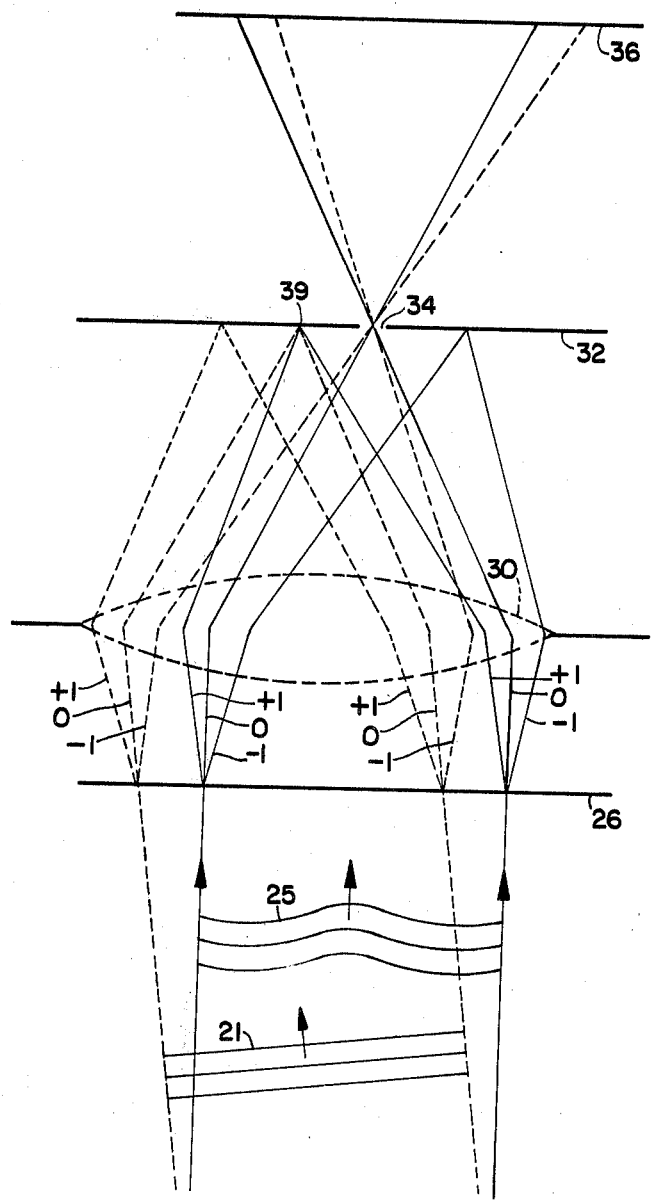
FIG. 4 is an enlargement of part of the apparatus of FIG. 3.

Referring still to FIG. 4, it can be seen that the 0$^{th}$-order from the first hologram reconstruction (plane wavefront 21) and the +1-order from the second hologram reconstruction (aspheric wavefront 25) could also easily be viewed by placing a pinhole at a point 39 where both of these orders are focused. Comparing these alternate wavefronts is valid because the +1-order wavefront represents a destructive intereference of the wavefront 25 from the part 38 with itself, i.e., the (−1)-order wavefront from the aspheric reconstruction represents a constructive interference of the wavefront 25 from the part 38 with itself.

This method of the invention for testing by fabricating a halogram from a mold insert and then reconstructing the hologram with a monochromatic source and a wavefront from a part to be tested, which part wavefront is the conjugate of one of the diffracted wavefront orders formed by the reconstruction of the hologram, allows a direct comparison between the mold insert and a plastic part molded from the insert. Thus, the method of this invention relieves the need of fabricating a perfect part and may be quickly and easily implemented. It may be applied to testing the most general aspheric surfaces including those of non-rotational symmetry and would work equally well with either transparent or opaque parts.

Those skilled in the art may make still other changes in the method and apparatus of invention according to the teachings of the disclosure herein. For example, the mirror 20 need not be tilted as shown in FIGS. 1 and 3, the effect thereof being easily duplicated by a plane mirror in combination with an optical wedge. In addition, the effects of the tilt of the mirror 20 can easily be duplicated by introducing a slight defocus in the hologram fringe pattern. This can be accomplished by changing the position of the insert 24 with respect to the lens 22 or by introducing a lens in the path of the reflected component of the laser beam 12. Moreover, instead of combining the diffracted orders as taught in the description of the preferred method and apparatus, it is possible to utilize higher orders from the hologram reconstructions and in such cases the orders to be combined would be any $n^{th}$-order diffracted wavefront from the first hologram reconstruction and an $(n+1)^{th}$-order wavefront from the second hologram reconstruction described in connection with FIG. 3. In addition, the apparatus illustrated in FIGS. 1 and 3 are not essential to the practice of the method of the invention so long as the steps of the method are complied with.

Still other changes may occur to those skilled in the art according to the teachings of the disclosure and it is therefore intended that all subject matter contained in the above description or shown in the accompanying drawings shall be interpreted as illustrative and not in a limiting sense.

What is claimed is:

1. A method for determining dimensional differences between two objects having complementary shapes comprising the steps of:
   constructing a hologram of one of the objects using radiant energy of predetermind temporal and spatial coherence;
   reconstructing said hologram using radiant energy substantially identical to that used to construct said hologram, said hologram operating to diffract said radiant energy incident thereto into n-number of wavefronts where $-a \leq n \leq +a$ and a is an integer;
   forming a wavefront from the other object by directing thereat radiant energy substantially identical to that used to either construct or reconstruct said hologram;
   directing said other object wavefront onto said hologram to reconstruct said hologram by transmitting therethrough said other object wavefront, said hologram also operating to diffract said other object wavefront into n-number of wavefronts where $-a \leq n \leq +a$ and a is an integer;
   combining a predetermined $n^{th}$-order wavefront from said first hologram reconstruction with the corresponding $(n+1)^{th}$-order wavefront from said other hologram reconstruction to form an interference pattern; and
   interpreting said interference pattern to determine the dimensional differences between said objects.

2. The method of claim 1 wherein said one object comprises a mold or mold insert and said other object comprises one of a plurality of parts fabricated using said mold or mold insert.

3. The method of claim 2 wherein said other object comprises a transparent optical element fabricated of an optical plastic material and includes at least one aspheric surface.

4. The method of claim 1 wherein said radiant energy utilized in said first reconstruction of said hologram of said one object and in the formation of said wavefront from said other object is provided by an expanded plane wavefront from a single laser.

5. The method of claim 4 wherein said laser comprises a helium-neon laser.

6. The method of claim 4 wherein said hologram is supported along a predetermined path and wherein a portion of said plane wavefront from said laser is directed along said path to impinge upon said hologram at a predetermined angle to reconstruct said hologram of said one object and wherein another portion of said plane wavefront is first retroreflected from said other object and then directed along said path to provide said other reconstruction of said hologram a second time.

7. The method of claim 1 wherein all of the refracted wavefronts from both of said hologram reconstructions in said method are spatially filtered so that only said $n^{th}$-order and said $(n+1)^{th}$-order wavefronts are combined to form said interference pattern.

8. The method of claim 1 further comprising the step of displaying said intereference pattern on a television screen.

9. A method for determining dimensional differences between two objects having complementary shapes comprising the steps of:
   constructing a hologram of one of the objects using radiant energy of predetermined temporal and spatial coherence;
   reconstructing said hologram using radiant energy substantially identical to that used in constructing said hologram, said hologram operating to attenuate the intensity of radiant energy incident thereto while transmitting the wavefront thereof undisturbed and additionally operating to diffract said radiant energy into ordered wavefronts comprising a plus one order wavefront that is identical to the wavefront which would be formed by reflecting from said one object the same kind of radiant energy used to construct said hologram and a minus one order wavefront that is the conjugate of said plus one order wavefront;
   forming a wavefront from the other object by directing thereat radiant energy substantially identical to that used to either construct or reconstruct said hologram and combining said other object wavefront with said minus one order wavefront from said hologram to form a viewable interference pattern; and interpreting said interference pattern to determine the dimensional differences between said objects.

10. The method of claim 9 wherein said one object comprises a mold or mold insert and said other object comprises one of a plurality of parts fabricated using said mold or mold insert.

11. The method of claim 10 wherein said other object comprises a transparent optical element fabricated of an optical plastic material and includes at least one aspheric surface.

12. The method of claim 9 wherein said radiant energy utilized in said first reconstruction of said hologram of said one object and in the formation of said wavefront from said other object is provided by an expanded plane wavefront from a single laser.

13. The method of claim 12 wherein said laser comprises a helium-neon laser.

14. The method of claim 12 wherein said hologram is supported along a predetermined path and wherein a portion of said plane wavefront from said laser is directed along said path to impinge upon said hologram at a predetermined angle to reconstruct said hologram of said one object and wherein another portion of said plane wavefront is first retroreflected from said other object and then directed along said path to provide said other hologram reconstruction.

15. The method of claim 9 further comprising the step of displaying said intereference pattern on a television screen.

16. A method for determining any dimensional differences between the shapes of objects intended to be complementary configured comprising the steps of:

constructing a hologram of one of the objects using radiant energy of predetermined temporal and spatial coherence;

reconstructing said hologram by directing thereat radiant energy substantially identical to that used to construct said hologram, said hologram operating to attenuate the intensity of said radiant energy directed thereat while transmitting the shape of the wavefront thereof undisturbed and to diffract said radiant energy directed thereat into ordered wavefronts comprising a plus-one order wavefront that is identical in shape to the wavefront which would be formed by said one object itself and a minus-one order wavefront that is identical in shape to the wavefront from an object having a shape that is precisely complementary to said one object;

forming a wavefront from the other complementary configured object by directing thereat radiant energy substantially identical to that used in constructing or reconstructing said hologram;

directing said other object wavefront onto said hologram to reconstruct said hologram a second time, said hologram operating to attenuate said other object wavefront while transmitting its shape undisturbed and to diffract said other object wavefront into ordered wavefronts comprising a minus-one wavefront which represents a combination of said other object wavefront and a wavefront from an object perfectly complementary in shape to said one object and a plus-one ordered wavefront which represents a combination of said other wavefront and a wavefront from said one object;

combining said attenuated, undisturbed wavefront from said first reconstruction of said hologram with said plus-one ordered wavefront from said second hologram reconstruction to form a viewable interference pattern which represents an interference of said other object wavefront and a wavefront from its perfect complementary shape; and interpreting said interference pattern to determine the dimensional differences between the shapes of said objects.

17. The method of claim 16 wherein said one object comprises a mold or mold insert and said other object comprises one of a plurality of parts fabricated using said mold or mold insert.

18. The method of claim 17 wherein said other object comprises a transparent optical element fabricated of an optical plastic material and includes at least one aspheric surface.

19. The method of claim 16 wherein said radiant energy utilized in said first reconstruction of said hologram of said one object and in the formation of said wavefront from said other object is provided by an expanded plane wavefront from a single laser.

20. The method of claim 19 wherein said laser comprises a helium-neon laser.

21. The method of claim 19 wherein said hologram is supported along a predetermined path and wherein a portion of said plane wavefront from said laser is directed along said path to impinge upon said hologram at a predetermined angle to reconstruct said hologram of said one object and wherein another portion of said plane wavefront is first retroreflected from said other object and then directed along said path to provide said other hologram reconstruction.

22. The method of claim 16 further comprising the step of displaying said interference pattern on a television screen.

23. Apparatus for determining any dimensional differences between the shapes of objects intended to be complementary configured, said apparatus comprising:

a hologram of one of the complementary configured objects, said hologram being constructed using radiant energy of predetermined temporal and spatial coherence;

means for mounting said hologram;

a source for providing radiant energy having substantially the same properties as that used to construct said hologram;

means for supporting the other object and said source in a predetermined manner;

means for reconstructing said hologram using at least a portion of said source radiant energy, said hologram operating to diffract said radiant energy incident thereto into n-number of wavefronts where $-a<n<+a$ and a is an integer; for forming a wavefront from said other object by directing thereat at least a portion of said source radiant energy; for directing said other object wavefront onto said hologram to reconstruct said hologram again, said hologram operating to diffract said other object wavefront into n-number of wavefronts where $-a<n<+a$ and a is an integer, and for combining a predetermined $n^{th}$-order wavefront from said first hologram reconstruction with the $(n+1)^{th}$-order wavefront from said other hologram reconstruction to form an interference pattern; and means for viewing said interference pattern so that said interference pattern can be interpreted to determine any dimensional differences between said objects.

24. The apparatus of claim 23 wherein said radiant energy source comprises a laser.

25. The apparatus of claim 24 wherein said laser comprises a helium-neon laser.

26. The apparatus of claim 24 wherein said next-to-last stated means comprises a beamsplitter and plane mirror configured and arranged with respect to said hologram and said other object so that the beam of said laser is divided by said beamsplitter and part thereof reflects from said mirror, back through said beamsplitter and onto said hologram and another part thereof is retroreflected from said other object, reflected from said beamsplitter and then directed onto said hologram substantially along the same path as was followed by said other part of said laser beam after it passed through said beamsplitter.

27. Apparatus for determining any dimensional differences between the shapes of objects intended to be complementary configured, said apparatus comprising:
a hologram of one of the complementary configured objects, said hologram being constructed using radiant energy of predetermined temporal and spatial coherence;
means for mounting said hologram;
a source for providing radiant energy having substantially the same properties as that used to construct said hologram;
means for supporting the other object and said source in a predetermined manner;
means for reconstructing said hologram by directing thereat at least a portion of said source of radiation so that said hologram operates to attenuate the intensity of said source radiation while transmitting the wavefront thereof undistributed and additionally operates to diffract said portion of said source radiation into ordered wavefronts comprising a plus one order wavefront that is identical to the wavefront which would be formed from reflecting from said one object radiation of the same kind as that of said source of radiation and a minus one order wavefront which is identical to the wavefront which would be formed by reflecting from a perfectly complementary configured other part the same kind of radiation as that of said source, for forming a wavefront from said other object by directing thereat at least a portion of said source radiation, and for combining said other object wavefront with said minus one order wavefront from said hologram to form an interference pattern; and
means for viewing said interference pattern so that said interference pattern can be interpreted to determine dimensional differences between said objects.

28. The apparatus of claim 27 wherein said radiant energy source comprises a laser.

29. The apparatus of claim 28 wherein said laser comprises a helium-neon laser.

30. The apparatus of claim 28 wherein said next-to-last stated means comprises a beamsplitter and plane mirror configured and arranged with respect to said hologram and said other object so that the beam of said laser is divided by said beamsplitter and part thereof reflects from said mirror, back through said beamsplitter and onto said hologram and another part thereof is retroreflected from said other object, reflected from said beamsplitter and then directed onto said hologram substantially along the same path as was followed by said other part of said laser beam after it passed through said beamsplitter.

31. Apparatus for determining any dimensional differences between the shapes of objects intended to be complementary configured, said apparatus comprising:
a hologram of one of the complementary configured objects, said hologram being constructed using radiant energy of predetermined temporal and spatial coherence;
means for mounting said hologram;
a source for providing radiant energy having substantially the same properties as that used to construct said hologram;
means for supporting the other object and said source in a predetermined manner;
means for reconstructing said hologram using at least a portion of said source radiant energy, said hologram operating to attenuate the intensity of radiant energy incident thereto while transmitting the wavefront thereof undisturbed and additionally operating to diffract said radiant energy into ordered wavefronts comprising a plus one order wavefront that is identical to the wavefront which would be formed by reflecting from said one object the same kind of radiant energy used to construct said hologram and a minus one order wavefront that is identical in shape to the wavefront formed by reflecting from a perfectly complementary configured other part radiation from said source, for forming a wavefront from said other object by directing thereat at least a portion of said source radiant energy, and then, for directing said other object wavefront at said hologram, said hologram further operating to attenuate said other object wavefront while transmitting its shape undisturbed and additionally operating to diffract said other object wavefront into ordered wavefronts comprising a minus one order wavefront which represents a combination of said other object wavefront and a wavefront from an object perfectly complementary in shape to said one object and a plus one order wavefront which represents a combination of said other object wavefront and a wavefront from said one object, and for combining said attenuated, undisturbed wavefront from said first reconstruction of said hologram with said plus one ordered wavefront generated by directing said other object wavefront at said hologram to form an interference pattern which represents an interference of said other object wavefront and a wavefront from its perfect complementary shape; and
means for viewing said interference pattern so that said interference pattern can be interpreted to determine dimensional differences between said objects.

32. The apparatus of claim 31 wherein said radiant energy source comprises a laser.

33. The apparatus of claim 32 wherein said laser comprises a helium-neon laser.

34. The apparatus of claim 32 wherein said next-to-last stated means comprises a beamsplitter and plane mirror configured and arranged with respect to said hologram and said other object so that the beam of said laser is divided by said beamsplitter and part thereof reflects from said mirror, back through said beamsplitter, and onto said hologram and another part thereof is retroreflected from said other object, reflected from said beamsplitter, and then directed onto said hologram substantially along the same path as was followed by said other part of said laser beam after it passed through said beamsplitter.

35. A method for determining any dimensional differences between the shapes of objects intended to be complementary configured comprising the steps of:

constructing a hologram of one of the objects using radiant energy of predetermined temporal and spatial coherence;

reconstructing said hologram using radiant energy substantially identical to that used to construct said hologram, said hologram operating to diffract said radiant energy incident thereto into n-number of wavefronts where $-a < n < +a$ and a is an integer;

forming a wavefront from the other object by directing thereat radiant energy substantially identical to that used to either construct or reconstruct said hologram;

directing said other object wavefront onto said hologram to reconstruct said hologram again, said hologram operating to transmit the shape of said other object wavefront undisturbed and also to diffract said other object wavefront into n-number of wavefronts where $-a < n < +a$ and a is an integer;

combining a predetermined $n^{th}$-order wavefront from said first hologram reconstruction with the corresponding $(n+1)^{th}$-order wavefront from said other hologram reconstruction to form an interference pattern; and interpreting said interference pattern to determine any dimensional differences between said objects.

* * * * *